UNITED STATES PATENT OFFICE.

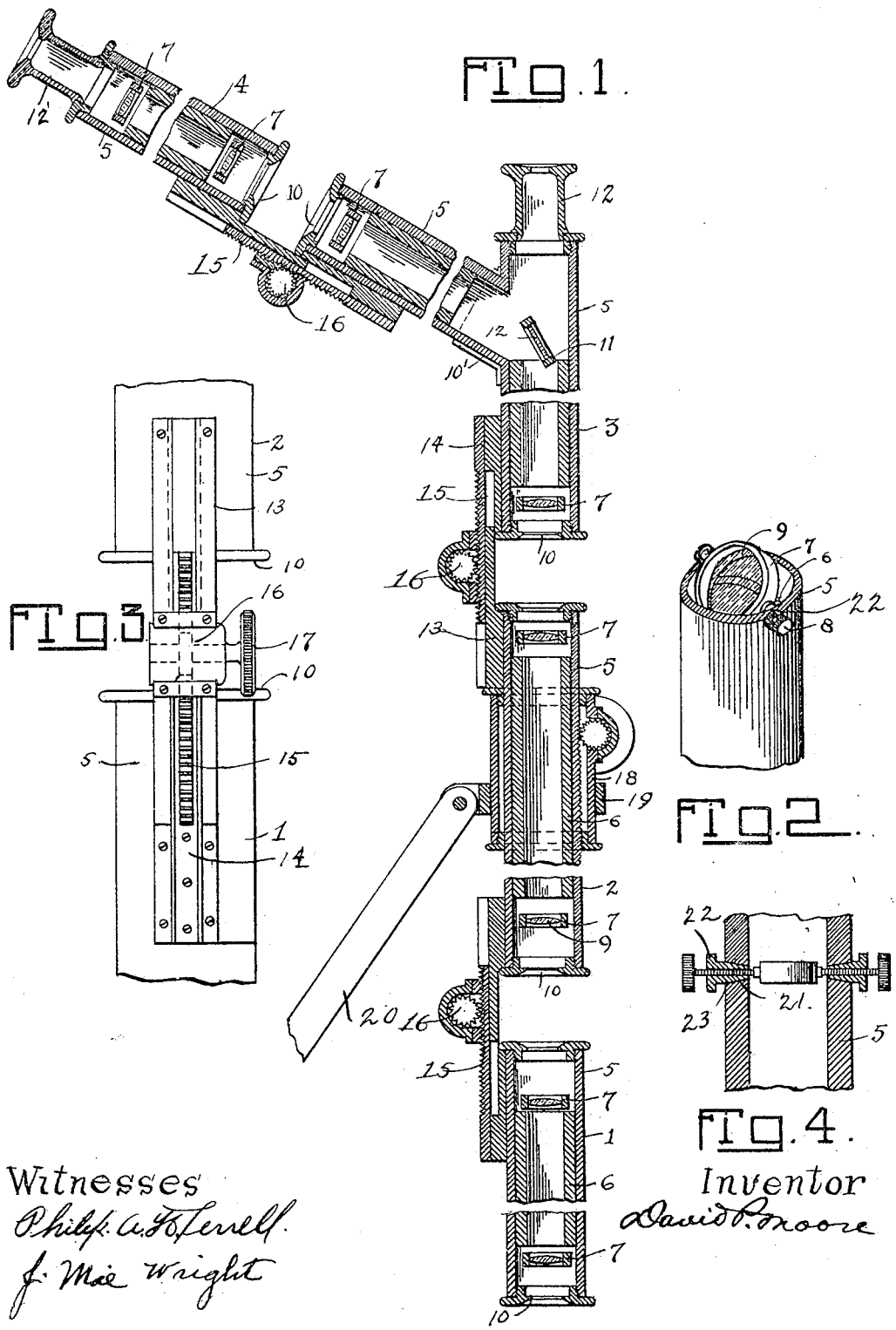

DAVID P. MOORE, OF WASHINGTON, DISTRICT OF COLUMBIA, ASSIGNOR TO MELINDA W. COSTELLO, OF LOWELL, MASSACHUSETTS.

OPTICAL DISTORTING APPARATUS.

No. 801,807. Specification of Letters Patent. Patented Oct. 10, 1905.

Application filed April 10, 1905. Serial No. 254,756.

*To all whom it may concern:*

Be it known that I, DAVID P. MOORE, a citizen of the United States, residing at Washington, District of Columbia, have invented certain new and useful Improvements in Optical Distorting Apparatus, of which the following is a specification, reference being had therein to the accompanying drawings.

This invention relates to improvements in optical distorting apparatus; and the main object of the invention is to provide an apparatus of this character by means of which interesting and entertaining demonstrations may be made in connection with and illustrating different purposes of optics.

To carry the invention into effect, a plurality of separated tubes and a series or plurality of lenses mounted in each tube in such a manner that they can be adjusted are provided, the said lenses being adjusted so as to distort the appearance of the object at which the tubes are pointed, such distortion depending entirely upon the adjustment or angle of the various lenses.

To attain these objects, the invention consists of a new and novel construction of apparatus, as will presently appear.

In the accompanying drawings, Figure 1 is a vertical sectional view of the improved apparatus. Fig. 2 is a detail view showing the manner in which the lenses are mounted, and Fig. 3 is an elevation showing the adjusting mechanism for the sections, and Fig. 4 is a detail sectional view of the adjusting mechanism for holding the lens in adjusted position.

Referring to the drawings, the numerals 1, 2, 3, and 4 designate the series of four tubular sections, each one of which is formed substantially of an outer tubular portion 5, open from end to end, an inner wall 6 being fitted within the portion 5, the said wall extending to a point near each end of the tubular portion.

Pivotally mounted within the space between each end of the walls 6 and the portion 5 is a lens-carrying frame 7, provided with an operating-knob 8, extending outwardly therefrom to enable the frame to be turned on its axis, as herein shown in Fig. 2. Mounted in each lens-carrying frame is a suitable double convex lens 9, said lens being of approximately the same diameter as the inner diameter of the walls 6. At each end of the portions 5 is provided an eyepiece 10. The lenses may be arranged so as to be of varying strength, the one nearest the eye being of minimum strength and each succeeding lens being stronger than the one preceding.

The section 3 is constructed somewhat differently from the remaining sections, although preserving the same general feature of having two lenses mounted in fixed relation to each other, each capable of having a pivoted movement. As shown in Fig. 1, this section has both a vertical and an angularly-extending portion 10', the two parts being secured together by brazing or otherwise, thus enabling the operator to use the apparatus to greater advantage, the section 4 being connected to the outer end of the angularly-extending portion of the section 3. At the intersection of the two portions of the section 3 is a pivotally-mounted frame 11, formed and mounted similarly to the lens-carrying frame 7, said frame 11 carrying a mirror 12, which serves to take the rays from the vertical portion of the apparatus into the angularly-extending portion.

To the outer end of the section 4 and the upper end of the vertical portion of the section 3 is secured suitable eyepieces 12' of smaller size than the eyepieces 10.

In order that the sections 1, 2, 3, and 4 may be adjustably connected together, I employ a suitable rack-and-pinion connection, as shown in the drawings, in which one section carries a slide 13, adapted to receive the sliding member 14, mounted on the next section. The sliding member carrying the rack 15 is adapted to be operated by a pinion 16, carried by the slide 13 and operated by a thumb-nut 17. In this manner each section may be moved adjustably toward or away from its neighboring section, and thus adjusting the distance between the lenses located adjacent to the ends which are being adjusted or without disturbing the position of the two lenses located within each section, the relative positions of which remain the same regardless of the relative movement of the sections themselves.

The section 2 is provided with the outer tubular portion 18, to which is secured a band 19, carrying the legs 20 of a tripod, by means of which the apparatus is supported in position. As it is necessary sometimes to obtain the proper focus the lower end of the apparatus is brought nearer or carried away from the object under inspection without disturbing the position of the sections relatively to each other, and I form a rack-and-pinion connection between the portions 5 and 18, as shown in Fig. 1, by means of which the viewing portion of the apparatus can be moved as a whole relatively to the supporting portion carried by the portion 18.

The interior of the apparatus is preferably lacquered, so as to exclude all unnecessary reflections.

In Fig. 4 the stem 21 projects through the flared opening 23 of one of the tubes and carries upon it the wedging or clamping nut 22, by means of which the lens is held at the proper adjustment, the clamping-nut being adapted to be forced inward, so that its inclined walls engage the walls of the opening 23, and thus tightly secure the lens in adjusted position.

From the foregoing description it is evident that by adjusting the sections the proper distance apart and turning the lenses at various angles the object at which the apparatus is pointed will be observable through the upper eyepiece in a very much distorted condition, thus providing a scientific as well as an amusement apparatus, as by the varying of the lenses and the adjustment of the sections different distortions may be secured.

What I claim as new, and desire to secure by Letters Patent, is—

1. In an apparatus of this character, the combination of a plurality of separated tubes, means for adjusting the tubes toward each other, a plurality of lenses pivotally mounted within the tubes, and means for holding the lenses stationarily in their adjusted position.

2. In an apparatus of this character, the combination of a series of tubes adjustably mounted with relation to each other, a support for holding said series in a substantially vertical position, another series of tubes mounted at an angle to the first-mentioned series of tubes, a reflecting-surface whereby the image projected through the first series of tubes may be seen through the second series of tubes, and a series of lenses mounted within said tubes.

3. The combination with a support, of a series of tubes arranged in vertical order, means for adjusting the tubes with relation to each other, an eyepiece at the upper end of the upper tubes, another series of tubes in communication with the first-mentioned tubes at an angle thereto, an eyepiece for the upper one of said series of tubes, a reflecting-surface mounted at the junction of the two series of tubes, and a series of lenses mounted in the tubes for the purpose set forth.

4. The combination with a support, of a series of tubes arranged in vertical order, means for adjusting the tubes with relation to each other, an eyepiece at the upper end of the upper tubes, another series of tubes in communication with the first-mentioned tubes at an angle thereto, an eyepiece for the upper one of said series of tubes, a reflecting-surface mounted at the junction of the two series of tubes, and a series of adjustably-mounted lenses mounted in the tubes for the purpose set forth.

In testimony whereof I affix my signature in presence of two witnesses.

DAVID P. MOORE.

Witnesses:
MILTON W. JOHNSON,
J. MAE WRIGHT.